(12) United States Patent
Frank et al.

(10) Patent No.: US 8,363,511 B2
(45) Date of Patent: Jan. 29, 2013

(54) METHOD AND DEVICE FOR DETECTION OF SURROUNDINGS

(75) Inventors: Michael Frank, Bretten (DE); Dirk Schmid, Simmozheim (DE)

(73) Assignee: Robert Bosch GmbH, Stuttgart (DE)

( * ) Notice: Subject to any disclaimer, the term of this patent is extended or adjusted under 35 U.S.C. 154(b) by 273 days.

(21) Appl. No.: 12/451,992

(22) PCT Filed: Jun. 3, 2008

(86) PCT No.: PCT/EP2008/056822
§ 371 (c)(1),
(2), (4) Date: Mar. 29, 2010

(87) PCT Pub. No.: WO2009/000613
PCT Pub. Date: Dec. 31, 2008

(65) Prior Publication Data
US 2010/0182874 A1    Jul. 22, 2010

(30) Foreign Application Priority Data
Jun. 28, 2007    (DE) .......................... 10 2007 029 959

(51) Int. Cl.
*G01S 15/00*    (2006.01)
(52) U.S. Cl. ...................................................... 367/101
(58) Field of Classification Search ................... 367/101
See application file for complete search history.

(56) References Cited

U.S. PATENT DOCUMENTS

| | | | | |
|---|---|---|---|---|
| 4,712,915 A * | 12/1987 | Kosakowski et al. .... | 356/139.08 |
| 6,166,995 A | 12/2000 | Hoenes | |
| 6,738,311 B1 * | 5/2004 | Guigne ............................ | 367/88 |
| 2001/0043652 A1 * | 11/2001 | Hooley ......................... | 375/238 |
| 2002/0085451 A1 * | 7/2002 | Gerosa ........................... | 367/132 |
| 2003/0060163 A1 * | 3/2003 | Filkins et al. ................ | 455/67.1 |
| 2003/0156495 A1 * | 8/2003 | Haase et al. ................... | 367/119 |
| 2004/0061640 A1 * | 4/2004 | Cornic et al. ................... | 342/70 |
| 2004/0081078 A1 * | 4/2004 | McKnight et al. ............. | 370/210 |
| 2005/0174281 A1 * | 8/2005 | Yokoo et al. ..................... | 342/70 |
| 2005/0254344 A1 * | 11/2005 | Barras ............................ | 367/76 |
| 2006/0036169 A1 * | 2/2006 | Satoh ............................ | 600/437 |
| 2006/0125920 A1 * | 6/2006 | Criminisi et al. ............. | 348/159 |
| 2006/0239121 A1 * | 10/2006 | Kong et al. .................... | 367/128 |
| 2007/0025608 A1 * | 2/2007 | Armstrong .................... | 382/132 |
| 2007/0116160 A1 * | 5/2007 | Eisenhut et al. ............. | 375/345 |
| 2007/0135079 A1 * | 6/2007 | Bromley .................... | 455/343.1 |

FOREIGN PATENT DOCUMENTS

| | | |
|---|---|---|
| DE | 197 44 185 | 4/1999 |
| DE | 199 63 755 | 7/2001 |
| DE | 10 2004 038 496 | 3/2006 |
| DE | 10 2005 033 403 | 1/2007 |
| EP | 0 447 874 | 9/1991 |
| EP | 1 624 319 | 2/2006 |
| GB | 2 352 294 | 1/2001 |
| WO | WO 2007/009833 | 1/2007 |
| WO | WO 2007/065591 | 6/2007 |

* cited by examiner

*Primary Examiner* — Isam Alsomiri
*Assistant Examiner* — James Hulka
(74) *Attorney, Agent, or Firm* — Kenyon & Kenyon LLP

(57) ABSTRACT

In a method and a device for detecting the surroundings, carrier waves in the form of transmission pulses are transmitted by at least one transducer, and reflections of the pulses are detected by the pulse-echo method. In this manner, the successive transmission pulses of one transducer or various transducers operated at the same time are differentiable by individual signal modulation.

16 Claims, 7 Drawing Sheets

| t/ms | S1 | S2 | S3 | S4 | S5 | S6 | $t_Z$ |
|---|---|---|---|---|---|---|---|
| 0 | S/R | | S/R | R | | S/R | 35 |
| 35 | S/R | | R | S/R | | S/R | 35 |
| 70 | S/R | | S/R | R | | S/R | 35 |
| 105 | S/R | | R | S/R | | S/R | 35 |

Fig. 10

Related Art

| t/ms | S1 | S2 | S3 | S4 | S5 | S6 | $t_Z$ |
|---|---|---|---|---|---|---|---|
| 0 | S/R | S/R | S/R | S/R | S/R | S/R | 35 |
| | | | | | | | |
| 35 | S/R | S/R | S/R | S/R | S/R | S/R | 35 |
| | | | | | | | |
| 70 | S/R | S/R | S/R | S/R | S/R | S/R | 35 |
| | | | | | | | |
| 105 | S/R | S/R | S/R | S/R | S/R | S/R | 35 |

Fig. 11

METHOD AND DEVICE FOR DETECTION OF SURROUNDINGS

BACKGROUND OF THE INVENTION

1. Field of the Invention

The present invention relates to sensor systems, and more specifically to detection of three-dimensional objects in space such that their positions with respect to a central site may be registered or corresponding distances may be determined.

2. Description of Related Art

Detection systems of this type may be used in a variety of ways, in particular in automotive engineering with the use of ultrasound for determination of distances in the range of a few centimeters to several meters.

Known applications include collision avoidance systems, parking space detectors, and parking assistants.

Corresponding systems for distance measurement and for detection of surroundings are already known in various embodiments from the related art.

Published German patent document DE 102005033403 A1 describes in general a method for measuring distances, e.g., by radar, lidar or acoustic waves, in which an echo transit time is measured and analyzed. To determine the echo transit time accurately, the reflected and detected signal is compared by correlation analysis with a reference signal allocated to the sent signal using a "matched filter."

Published German patent document DE 19744185 A1 describes an ultrasonic distance measurement for a motor vehicle in which multiple ultrasonic transducers are used. Simultaneous transmission of ultrasonic pulses is used by utilizing the superpositioning and addition of corresponding wave amplitudes to achieve higher transmission powers and thus greater ranges.

Published U.K. patent document GB 2352294 A describes an ultrasonic distance measuring system for motor vehicles, in which converters are operated one after the other at different frequencies, to be able to correct interferences or obliterations, which may occur randomly at certain frequencies, by operating at other frequencies.

Published German patent document DE 19963755 A1 describes a distance measuring device for a motor vehicle, in which several distance sensors are provided which may be operated in different operating modes to improve the quality of the measurement.

Published German patent document DE 102004038496 A1 discloses a device and a method for measuring distance for a motor vehicle, measuring certain ambient conditions of the vehicle, which have an influence on signal propagation, e.g., temperature and atmospheric humidity, when using ultrasonic signals. These variables are taken into account in analysis of the echo signals.

BRIEF SUMMARY OF THE INVENTION

Against the background of the related art, an object of the present invention is to create a method and a device for detection of surroundings, in which the measurement rate is increased and data quality is improved by using carrier waves transmitted by at least one transducer and detection of reflections of the transmitted carrier waves in the pulse-echo method.

The present invention is based on the idea of making different pulses, each being transmitted on one carrier wave for one pulse length, differentiable by modulating the carrier wave in such a way as to allow differentiation of the individual pulses.

This results in pulses of the first type, pulses of the second type and, if necessary, additional types, each having a different modulation.

For example, if similar pulses are transmitted sequentially by a single transducer, then in the normal case, after transmission of a pulse length of approximately 300 microseconds, it is necessary to wait the duration of one measurement interval to be sure that the corresponding reflections have been sent back to a transducer if a detectable body is present.

If a measurement range of approximately five meters is the goal, then with an assumed velocity of sound of 343 meters per second, a waiting period of 30 milliseconds would be necessary to be certain that, in the case of an object within the detection range, any reflected signal would arrive at a transducer. After that, a new pulse should be transmitted by a transmitter only if it is not to be confused with the first pulse. The present invention creates a remedy here, in that a pulse of the second type is already transmitted by the same transducer or by another transducer during the measurement interval, the pulse of the second type being differentiable from the pulse of the first type by the modulation.

The reflection signals received by the transducers may be distinguished based on the modulation and allocated to the particular transmission points in time. In this way, pulses may be transmitted much less often on the whole than according to the related art, thereby increasing the measurement rate. For example, a pulse of the second type and a pulse of the third type may be transmitted additionally during the course of the measurement interval.

In addition to differentiating various pulses transmitted by a single transducer at different times, it is also possible according to the present invention to differentiate various transducers on the basis of the modulation of the pulses they transmit.

If various similar transducers are operated in such a way that their signals or their reflections are able to interfere with one another, then after transmission of a first pulse, it is basically also necessary here to wait until its reflections have arrived or would have arrived, as the case may be. During this time, neighboring transducers may be operated only to a limited extent. If the pulses originating from various transducers are differentiable by different modulations, then various transducers may also transmit corresponding pulses at the same time or with a brief time difference.

The reflections may each be detected by the transducer, which has transmitted the corresponding pulse, or by other transducers, e.g., in the immediate vicinity. Depending on the technology used, these transducers may be used for transmitting and receiving pulses, as is known of ultrasonic transducers, for example.

Reflections of transmitted pulses may optionally also be detected in parallel by multiple transducers to achieve a higher detection reliability or to obtain additional information in addition to the distance measurement for the purpose of more accurate positioning of a detected object.

Due to the differentiability of various pulses, for example, it is also ensured that an echo pulse arriving with a delay because of an object situated outside of the planned detection range will not be erroneously allocated to a pulse transmitted later. In periodic operation of a corresponding detection method according to the related art, a systematic error detection in the sense of aliasing would then occur. This is prevented by the means according to the present invention.

According to the present invention, it is basically possible to perform an individual analog or a digital amplitude modulation or an analog or a digital angle modulation for differentiation of pulses.

A suitable signal may be modulated onto the carrier wave by using the known analog amplitude modulation. The information content and thus the differentiability of different pulses depend essentially on the bandwidth of the carrier signal and the length of the transmitted pulse. Higher-frequency carrier waves thus allow better differentiability or more different differentiable pulses than lower-frequency carrier waves.

Furthermore, digital amplitude modulation may be performed by modulating the amplitude in discrete increments or by applying certain periodic or nonperiodic codings to the carrier wave.

Angle modulations include, for example, the known frequency modulation, which is familiar from the field of radio, as well as phase modulations.

Digital angle modulation may also be combined with amplitude modulation and may include a variety of known codes in general.

Less error-susceptible codings in particular, which are known from the communications technology, should be emphasized here, such as the so-called Hamming codes, which also allow a correction of signals, even with slightly defective transmission, and thus offer great transmission reliability.

Of the codes which take into account specifically the phase relation of a signal, the so-called Manchester codes are to be emphasized, which also allow clock pulse recovery of a signal, for example.

Combinations of analog and digital modulations are basically also conceivable as well as combinations with various carrier waves, which make individual pulses additionally differentiable. Pulse modulation, in which a continuous analog signal is converted to a time-discrete signal sequence, should also be mentioned, where pulse-width modulation, pulse-amplitude modulation or pulse-frequency modulation as well as pulse-phase modulation may be provided.

A variety of modulation methods by which a large number of pulses may be rendered differentiable are thus available. The prerequisite for differentiability is that the corresponding transducers must be able to differentiate the reflected signals on reception. Various digital and/or analog filter techniques and correlation techniques are known for this purpose and may be used in implementation of the present invention.

According to one example embodiment of the present invention, ultrasonic waves may be used as carrier waves for this method. Corresponding transducers are available and are already being used extensively in automotive engineering. Essentially, however, the use of microwave transducers, for example, is also conceivable alternatively or additionally within the scope of the present invention.

When the present invention is used in a vehicle, either as part of a collision avoidance system, a parking space detection system, or a parking assistant, multiple transducers are often distributed throughout the vehicle. For example, at least three, in particular also more than four, transducers may also be used in parallel, e.g., distributed along a front and/or rear bumper of the vehicle. The transmission and reception directions of the individual transducers may be different, so that intersecting or nonintersecting solid angles are allocated to the individual transducers.

The present invention also relates to a device according to the present invention for detection of surroundings using at least one ultrasonic transducer for transmission of pulses, a central unit in which different modulations of different transmission times and/or transducers are allocated, an ultrasonic transducer for detecting reflections and an analyzer unit for analyzing reflection times, taking into account different modulations and the transducers and/or transmission points in time allocated to them.

Such a device allows not only transmission of different types of pulses but also differentiation and allocation to certain transmission times and thus management of the pulses transmitted at the same time or with a slight time lag and their reflections. The central unit may stipulate for one or more transducers certain modulations for differentiation, or essentially a certain pattern or a certain modulation may be provided from the beginning for each transducer, so that the particular transducer then provides the central unit with information about the transmission and the modulation used in transmission of a signal.

In an analyzer unit, the individual transit times of individual pulses are then calculated and distance values are derived therefrom. These may be compared or combined with one another to generate a virtual image of the surroundings of a motor vehicle, for example or, in the simplest case, to transmit an alarm if the distance from an obstacle is too small.

When used as part of a parking space sensor, in addition to distance detection, which is based primarily on the depth of the parking space, the length of the parking space must be detected, e.g., by combining the measured values of various transducers, or by measurement of the distance traveled by the vehicle during the parking space measurement.

BRIEF DESCRIPTION OF SEVERAL VIEWS OF THE DRAWING

FIG. 10 shows an operating scheme for a group of transducers according to the related art.

FIG. 11 shows a scheme for operation of transducers according to the present invention.

DETAILED DESCRIPTION OF THE INVENTION

Figure 1:
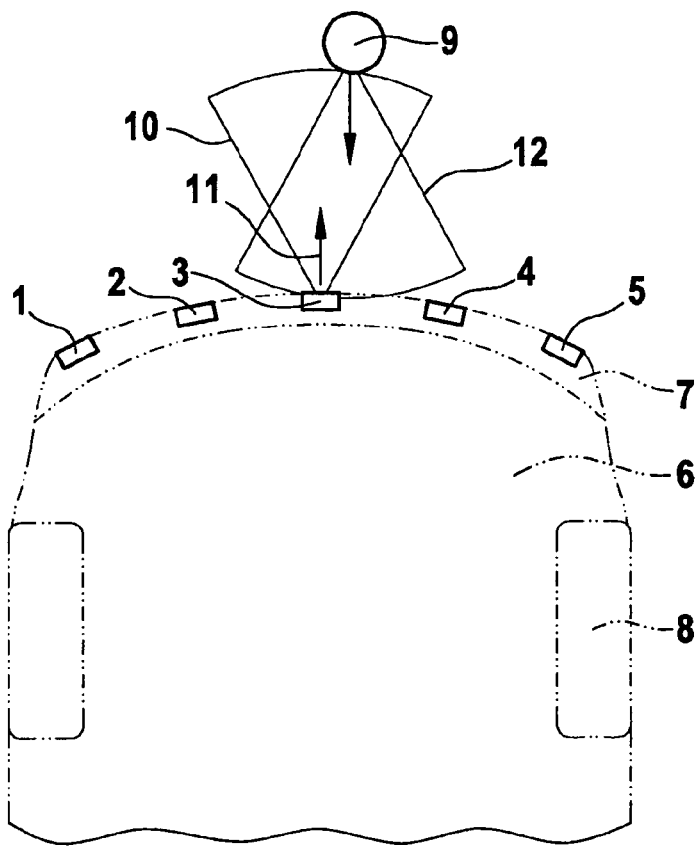
FIG. 1 schematically shows a view of multiple transducers in a motor vehicle as seen from above.

FIG. 1 schematically shows from above a part of a motor vehicle 6 having a bumper 7, on which ultrasonic transducers 1, 2, 3, 4, 5 are situated. Tires 8 are shown schematically on motor vehicle 6.

In addition, an object 9 to be detected by the ultrasonic transducer is situated in front of the motor vehicle. It may be a traffic obstacle, a bucket, a street sign or a light as well as another vehicle.

In conjunction with transducer 3, a transmission cone 10 and a directional arrow 11 are shown, indicating the transmission direction. Transmission cone 10 strikes an object 9 to be detected in such a way that the pulse is partially reflected by it in the direction of transducer 3 in a second transmission cone 12.

Transducer 3 records the reflection and, on the whole, the device records time t elapsed between the transmission of the transmission pulse and the reception of the reflection.

With a known signal speed, e.g., the speed of sound of 343 m/s, the distance of object 9 from transducer 3 may be calculated from the time elapsed.

Under differing ambient conditions, which may influence the signal speed, e.g., the speed of sound, these may be detected by additional sensors (not shown) and also taken into account in the calculation. In this regard, measurement of the air temperature is also conceivable.

FIG. 1 also shows that reflected transmission cone 12 may strike not only transducer 3 but also neighboring transducers 2 and 4, which likewise record the reflection. Like other transducers 1, 5, these transducers 2, 4 also transmit their own ultrasonic signals in the form of pulses, whose reflections they monitor. The problem arises that the corresponding pulses are recorded not only by the transmitting transducers, e.g., the transducer provided for detection of the reflection, but also by neighboring transducers.

If the signals are not differentiable, this yields ambiguities and thus wrongly allocated or wrongly calculated distances from objects.

This problem may occur even in operation of a single transducer 3 as soon as successive transmission pulses are transmitted by it in an interval that is too short. In the ideal case, after transmission of a pulse lasting 300 microseconds, for example, the elapse of the entire measurement interval should be awaited in which corresponding reflections from objects 9 situated within the detection range of the detection device are to be expected. Such a detection range may be, for example, a distance of approximately five meters in detection of a parking space, so the measurement interval is at least 30 milliseconds.

If additional pulses are to be transmitted within this measurement interval, then the pulses must be differentiable from one another.

This is precisely accomplished by the present invention through corresponding modulation of the carrier waves of the transmitted pulses.

Figure 2:
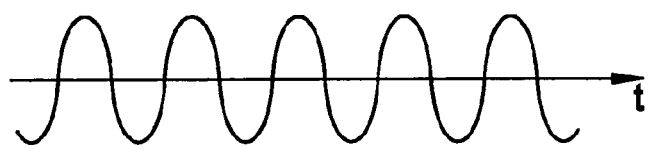
FIG. 2 schematically shows a carrier wave.

FIG. 2 schematically shows a carrier wave such as that generable by an ultrasonic transducer, approximately in a sinusoidal form. Time t is plotted on the abscissa. However, in addition to the sinusoidal form, other periodic oscillations may also be considered.

Figure 3:
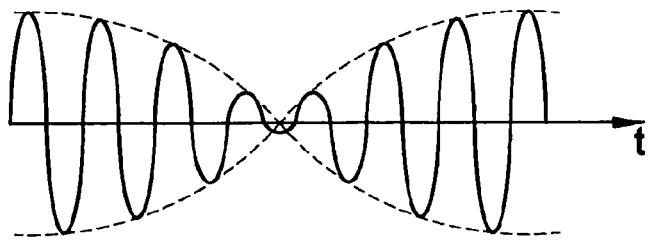
FIG. 3 shows an amplitude-modulated carrier wave.

FIG. 3 shows a signal similar to that from FIG. 2 with amplitude modulation such as that known from the field of radio.

Figure 4:
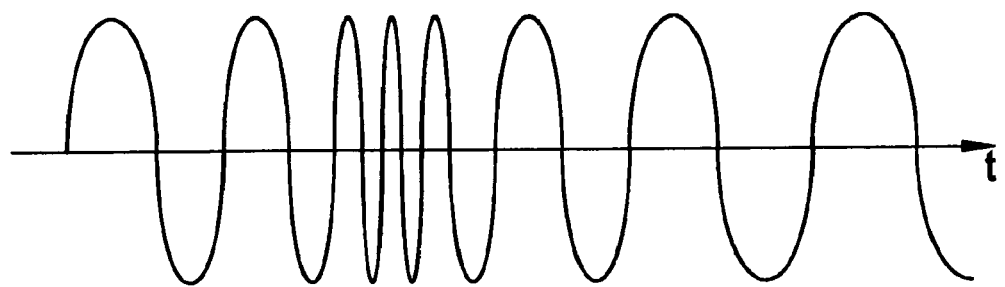
FIG. 4 shows a frequency-modulated carrier wave.

FIG. 4 shows a frequency-modulated oscillation signal, which is also basically known from the related art.

Figure 5:
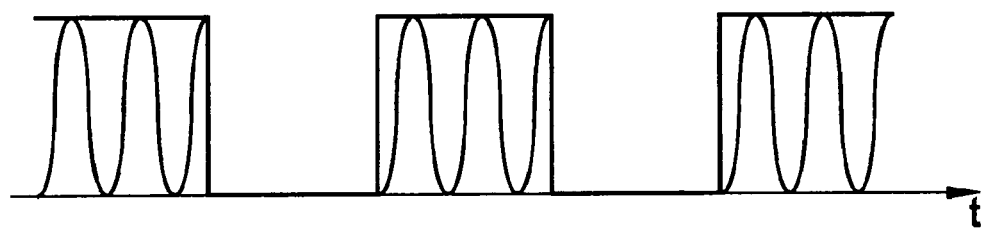
FIG. 5 shows a digitally amplitude-modulated carrier wave.

FIG. 5 shows a digitally amplitude-modulated signal in which the carrier wave is modulated in a step function, signal strength 0 prevailing between the individual pulses transmitted.

Figure 6:
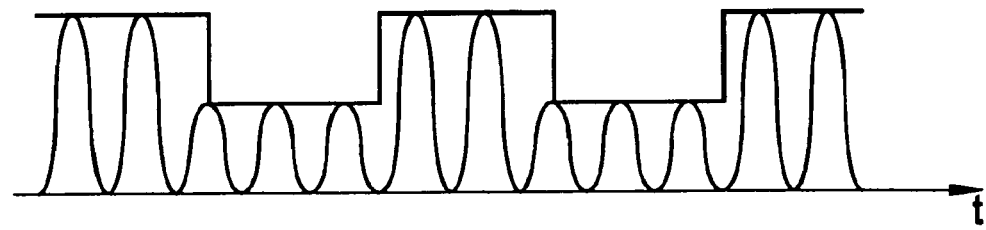
FIG. 6 shows a digitally amplitude-modulated carrier wave with a smaller degree of modulation than in FIG. 5.

In contrast with that, FIG. 6 shows a signal having a lower degree of modulation, a step function again being modulated onto the signal, and the signal of the carrier wave being switched in alternation between a full amplitude and a half amplitude.

Corresponding digital modulations may also be used to transmit digital codes such as those known from line coding, for example. With corresponding digital coding, error-tolerant codes or self-correcting or correctable codes such as Hamming Codes may also be used.

Figure 7:
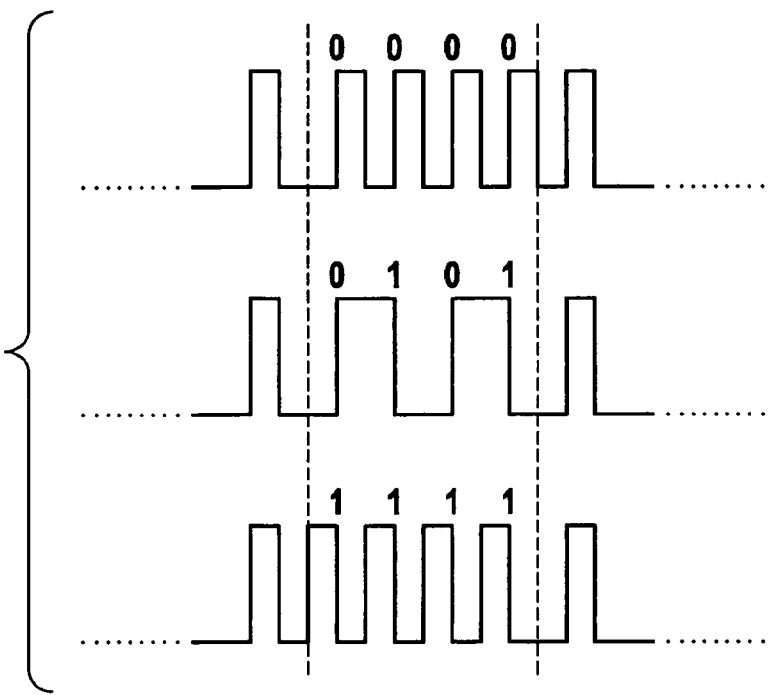
FIG. 7 shows several codes in Manchester coding.

FIG. 7 shows a diagram of a four-bit-long code word on the basis of Manchester coding as an example of a phase-modulating code. This code provides a start bit at the beginning of a pulse with respect to which subsequent bits are represented by the chronological sequence of the following voltage flanks. The time axis is shown in the horizontal direction of the diagram, a start bit marking the beginning, and the dashed vertical lines marking the start of the first bit and the end of the last of the four bits. A rising flank at the start of a bit cycle marks a 1, no flank or a descending flank marks a 0.

Bit sequence 0000 is thus shown in the top partial diagram of the three partial diagrams, bit sequence 0101 is shown in the middle, and bit sequence 1111 is shown in the bottom partial diagram.

Figure 8:
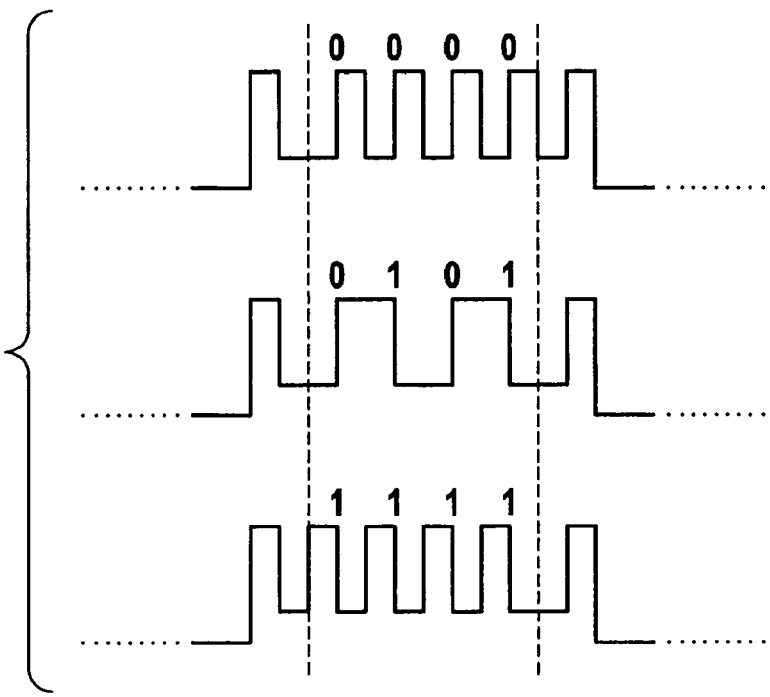
FIG. 8 shows the codes from FIG. 7 in Manchester coding with a lower degree of modulation.

The same bit sequences are also represented by Manchester coding in FIG. 8, but with a lower degree of modulation.

Figure 9:
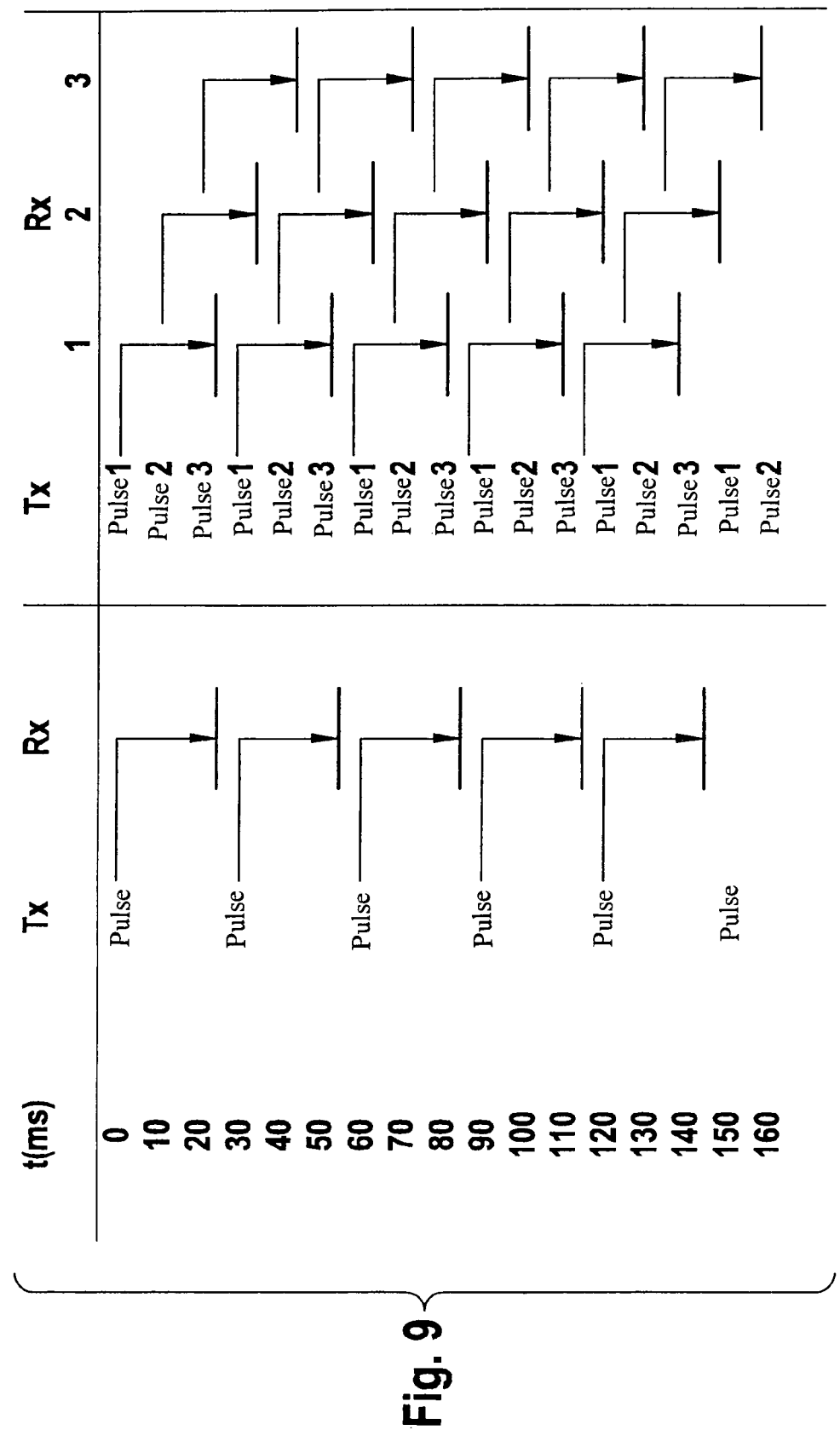
FIG. 9 shows the distribution of pulses having various modulations in intersecting measurement intervals.

FIG. 9 shows a measuring procedure for detecting objects or for measuring a distance by using corresponding transducers in a vertical sequence beginning at the top. An approach according to the related art is shown in the left half, and an approach according to the present invention is shown in the right half.

It is assumed here that the measurement intervals amount to approximately 30 milliseconds, so that according to the left half diagram, a pulse is transmitted at t=0 milliseconds (tx=transmission x) and the reflection is expected between 0 and 30 milliseconds and is monitored by a transducer. During this time, no additional transmission pulse is transmitted, so there will not be any mix-ups. The next pulse is not transmitted until after 30 milliseconds have elapsed, when no reflections are awaited from an object within the detection range of approximately five meters, and so forth, so that five pulses are transmitted within approximately 150 milliseconds, and their reflections may be awaited.

The right half of the drawing shows that in the same period of time, e.g., during the first 30 milliseconds, three pulses, i.e., pulses 1, 2, 3, may be transmitted, each with a time lag of approximately 10 milliseconds. The corresponding reflections are awaited individually, i.e., 30 milliseconds each after transmission of the particular pulse. The measurement intervals may intersect because the individual transmission pulses are differentiable due to modulation.

The figure shows that three transducers R1, R2, R3 are available to detect the reflections. However, detection may also be accomplished via a shared transducer or via more than three transducers. It is found that on the whole, three times as many pulses are transmittable and detectable in the same period of time of 150 milliseconds as in the related art. Therefore, substantially more measured points may be obtained for scanning the surroundings of the measuring device or the surroundings of a motor vehicle, so that the quality of the measurement may be greatly improved. Due to the better differentiability of the pulses, there are fewer misallocations, such as delayed detection of reflected echo pulses of an earlier pulse, and thus also in the quality of individual pulse-echo measurements.

This yields a significant improvement in the function of the detection method according to the present invention with little complexity.

FIG. 10 shows joint and simultaneous operation of multiple transducers, six transducers S1 to S6 being listed in a table in this example. The chronological sequence begins with the first row of the table and ends with the last row. The left column shows the running measuring time in milliseconds. The column at the far right shows the cycle times or measurement intervals allocated to each individual measurement, namely 35 milliseconds each in the present example.

According to the related art as illustrated in FIG. 10, simultaneous transmission operation with two transducers situated directly side by side, such as S1 and S2 or S3 and S4 or S2 and S3, is thus possible only with disadvantages. The columns of the table that are side by side thus also represent transducers directly adjacent to one another in a measuring device.

For example, during the first cycle, S1 is operated as the transmitter, while S2 remains functionless, S3 is operated as a transmitter, and S4 cannot be operated as a transmitter because it is a direct neighbor of S3, but instead is operated as a receiver. S5 also cannot be operated as a transmitter since it is a direct neighbor of S6.

The particular transducers operated as transmitters may additionally be used as receivers in the course of the measurement interval.

In the following measurement interval, S3 and S4 change their functions, so that S4 in this case functions as the transmitter and receiver but S3 functions only as a receiver.

Due to this distribution of the transmission groups, this ensures that two directly neighboring transducers are never operated simultaneously in transmission operation because this would result in interference in the measurement as long as the transmitted pulses, in particular ultrasonic pulses, are not differentiable.

In contrast with FIG. 10, FIG. 11 shows a transmission group diagram according to the present invention, the tabular diagram having a structure similar to that according to FIG. 10.

However, in contrast with the related art, neighboring transducers S1, S2, S3, S4, S5, S6 may also be operated simultaneously at different modulations in transmission operation. This takes place in each of the four measurement intervals. Blank rows 13, 14, 15 are provided between the rows, each of which is allocated to the start of the measurement intervals. This should indicate that additional pulses may be transmitted by transducers S1 to S6 within the same measurement interval between 0 and 35 milliseconds, between 35 and 70 milliseconds and between 70 and 105 milliseconds inasmuch as, due to the modulation, they are differentiable from the particular pulses already transmitted by a transducer.

The overview thus shows that it may be easy to operate multiple transducers simultaneously and side by side according to the present invention, and the frequency at which the pulses may be transmitted is also definitely increased in comparison with the related art.

Figure 12:
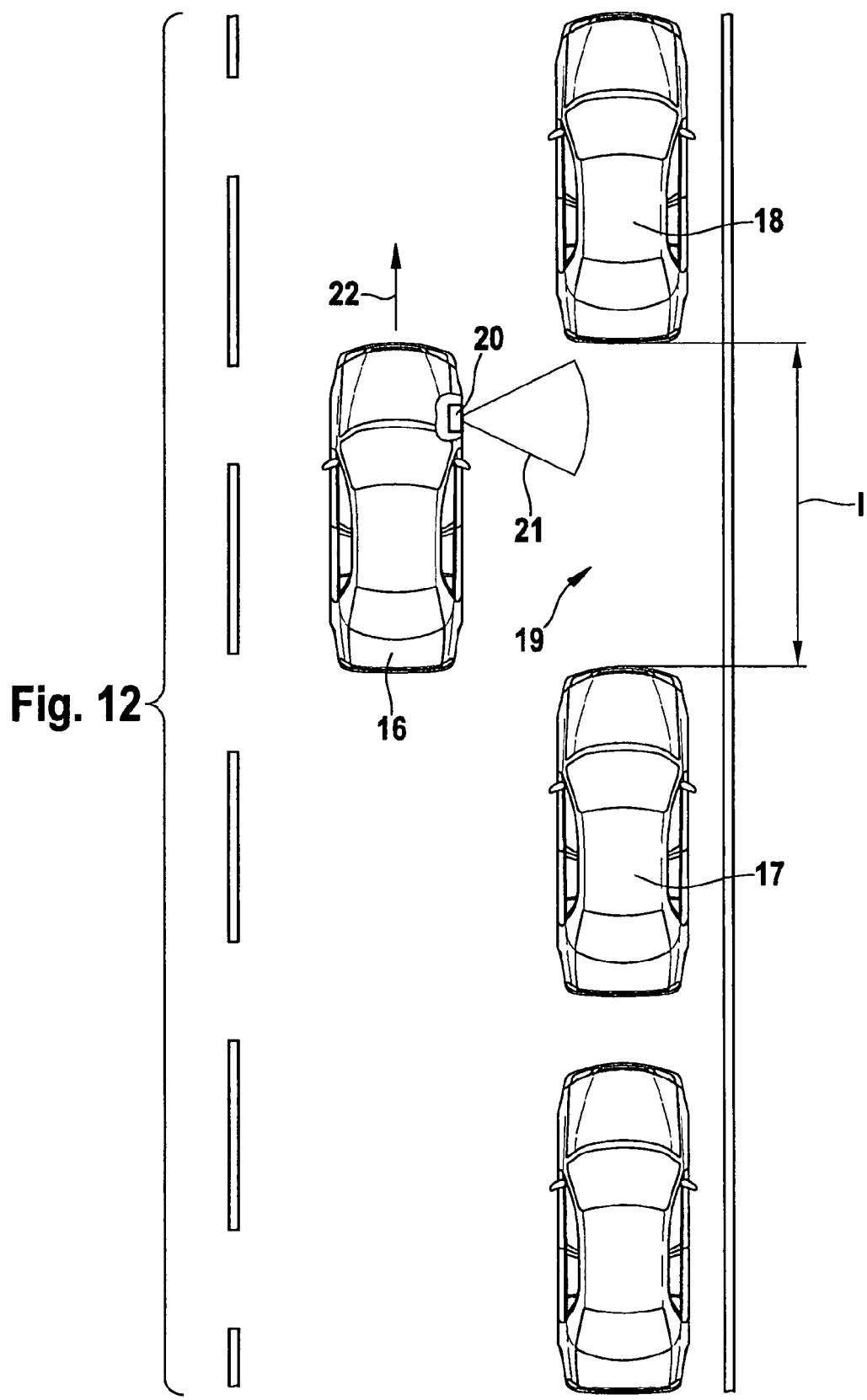
FIG. 12 schematically shows a traffic situation with vehicles as seen from above in parking space detection.

FIG. 12 schematically shows a parking spot search operation involving multiple vehicles as seen from above. Vehicle 16 is on the road seeking a parking space, while parked vehicles 17, 18 may occupy parking spaces or may leave a parking space 19 free between them. The vehicle has at least one sensor/transducer 20 transmitting ultrasonic pulses laterally perpendicular to the direction of travel, as indicated by transmission cone 21. The detection range of the transducer is set for a maximum of approximately 5 meters, so that the absence of reflections after transmission of ultrasonic pulses indicates that no obstacle is present within five meters laterally next to the vehicle. If the vehicle moves in the direction of arrow 22, then the distance traveled is measurable by rolling angle sensors on the wheels until transducer 20 detects parked vehicle 18 next to vehicle 16 and thus marks the end of the parking spot. By calculating the distance traveled, it is thus possible to record and analyze the length of the parking spot in addition to the parking depth detected. The length of the parking spot is labeled as 1 in FIG. 12.

Figures 13A, 13B:
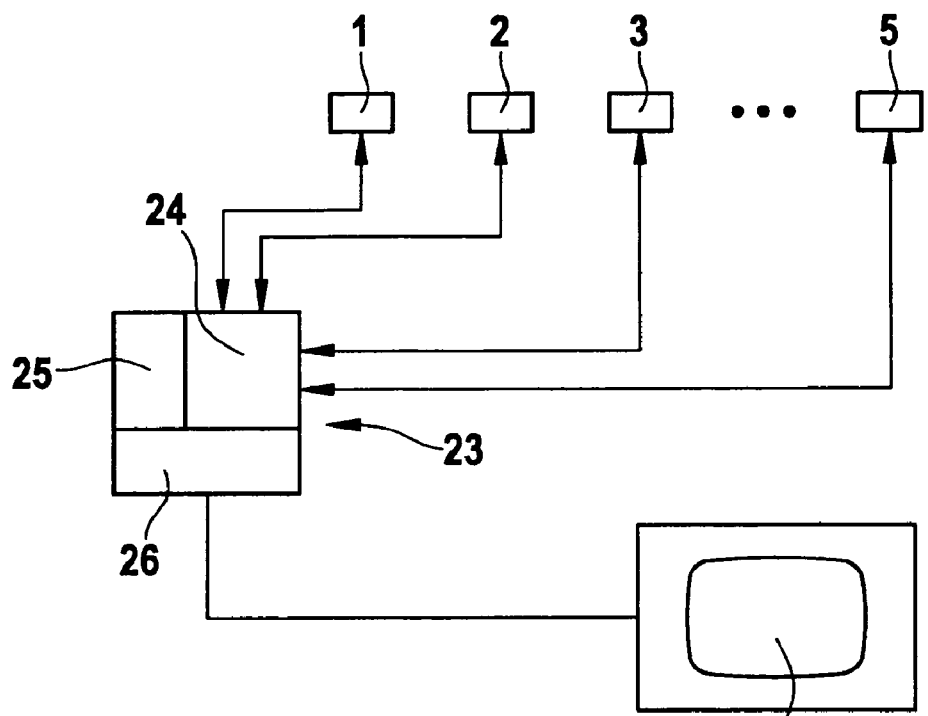
FIGS. 13a, b schematically show the design of a device according to the present invention.

FIGS. 13a, b schematically show a device for implementing the method according to the present invention for detection of surroundings using ultrasonic transducers 1, 2, 3, 5, which communicate with a central unit 23. Central unit 23 may also be situated on one of the transducers in the form of a microcontroller, for example. However, the function of the central unit may also be integrated into a processor, which is already present in the vehicle anyway.

The central unit may trigger individual transducers 1, 2, 3, 5 to transmit ultrasonic pulses of different modulations. The modulations may be defined in the transducers themselves or may be determined by central unit 23. Central unit 23 therefore has an input/output unit 24, which also has corresponding analytical equipment to be able to allocate reflected echo pulses detected by transducers 1, 2, 3, 5 to a certain modulation.

In a memory unit 25, also shown enlarged in FIG. 13b, particular transmitting transducers SNR and particular modulation types Mod NR are allocated to corresponding transmission times t for the individual pulses. In a subsequent analysis by an evaluation unit 26, incoming echo-pulse data are compared with data stored in memory unit 25, so that the reflection and the point in time of arrival of the reflected pulse may be allocated to each modulated transmitted pulse, if necessary. Operating times are determined from this in the evaluation unit and then distances are in turn determined. These values are transmitted to an imaging unit 27, which generates a virtual image of the surroundings, for example of a motor vehicle from the various detected distance values.

Essentially, measurement errors may be corrected by the modulation/coding of the pulses, and the individual measurements therefore become more reliable. To further reduce measurement error, the measuring cycles of different transducers may be shifted somewhat with respect to one another either systematically or randomly to reduce crosstalk of signals or to make misallocations of reflections to foreign signals less likely.

What is claimed is:

1. A method for detection of surroundings by using carrier waves transmitted by at least one transducer and detecting reflections of the transmitted carrier waves by a pulse-echo technique, comprising:
   transmitting a pulse of a first type by a first transducer using a carrier wave for a pulse length;
   transmitting a pulse of a second type by one of the first transducer or another transducer, wherein the pulse of the first type differs from the pulse of the second type in modulations of the respective carrier waves; and
   differentiating a reflection of the pulse of the first type from a reflection of the pulse of the second type on the basis of the different modulations.

2. The method as recited in claim 1, wherein the first transducer transmits the pulses of the first and second types.

3. The method as recited in claim 2, wherein the reflection of a pulse is detected respectively by the same transducer which transmitted the pulse.

4. The method as recited in claim 3, wherein the reflection of a pulse is additionally detected by at least one neighboring transducer.

5. The method as recited in claim 1, wherein the pulses of the first and second types are transmitted by different transducers.

6. The method as recited in claim 1, wherein the modulation is one of analog amplitude modulation or digital amplitude modulation.

7. The method as recited in claim 1, wherein the modulation is one of analog angle modulation or digital angle modulation.

8. The method as recited in claim 7, wherein the modulation uses Manchester coding.

9. The method as recited in claim 1, wherein the modulation is digital modulation in the form of a coding.

10. The method as recited in claim 9, wherein the digital modulation uses Hamming coding.

11. The method as recited in claim 1, wherein the pulses of the first and second types additionally differ from one another in using different carrier waves.

12. The method as recited in claim 1, wherein ultrasonic waves are used as the carrier waves.

13. A method for detection of surroundings, comprising:
transmitting a first pulse of a first type;
transmitting a second pulse of the first type after at least a predefined measurement interval following the transmitting of the first pulse, wherein arrival of a reflection of the first pulse at a transducer is to be expected; and
transmitting, during the predefined measurement interval, a pulse of a second type differing from the pulses of the first type in modulation.

14. The method as recited in claim 13, further comprising:
transmitting, before the predetermined measurement interval has elapsed, at least one pulse of a third type differing from the pulses of the first type and the second type in modulation.

15. The method as recited in claim 14, wherein at least three ultrasonic transducers are used in parallel.

16. A device for detection of surroundings, comprising:
at least one ultrasonic transducer configured to transmit pulses;
a central unit configured to allocate different modulations to at least one of different transmission times and different transducers;
at least one ultrasonic transducer configured to detect reflections of transmitted pulses; and
an evaluation unit configured to analyze reflection times for the transmitted pulses, taking into account at least one of different modulations, different transducers and different times of transmission of the respective pulses.

* * * * *

UNITED STATES PATENT AND TRADEMARK OFFICE
CERTIFICATE OF CORRECTION

PATENT NO.        : 8,363,511 B2                                                                Page 1 of 1
APPLICATION NO. : 12/451992
DATED             : January 29, 2013
INVENTOR(S)       : Frank et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 363 days.

Signed and Sealed this
First Day of September, 2015

Michelle K. Lee
*Director of the United States Patent and Trademark Office*